C. D. CLARK.
BARREL MAKING MACHINE.
APPLICATION FILED AUG. 9, 1911.
1,103,562.
Patented July 14, 1914.
4 SHEETS—SHEET 1.
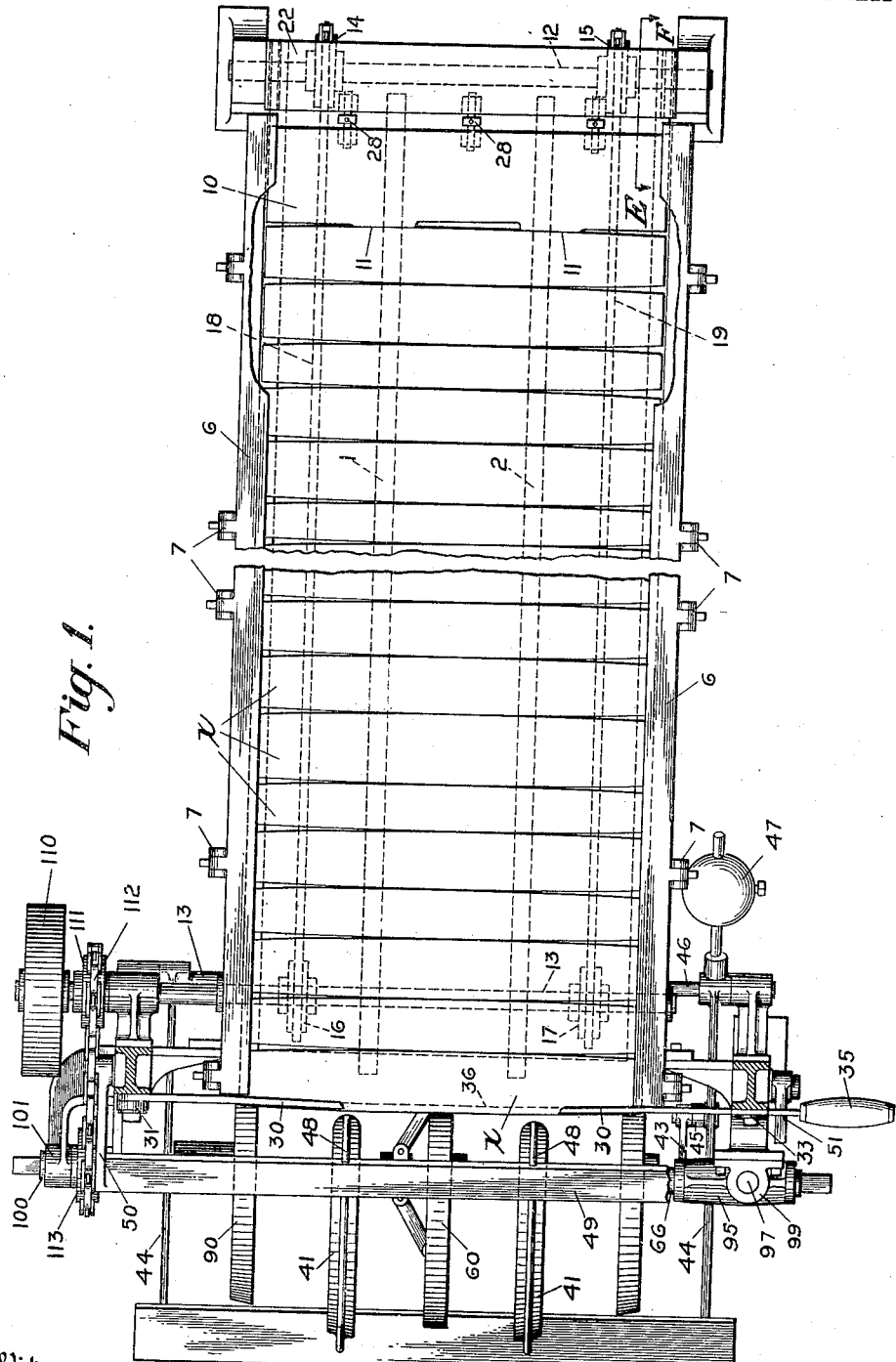

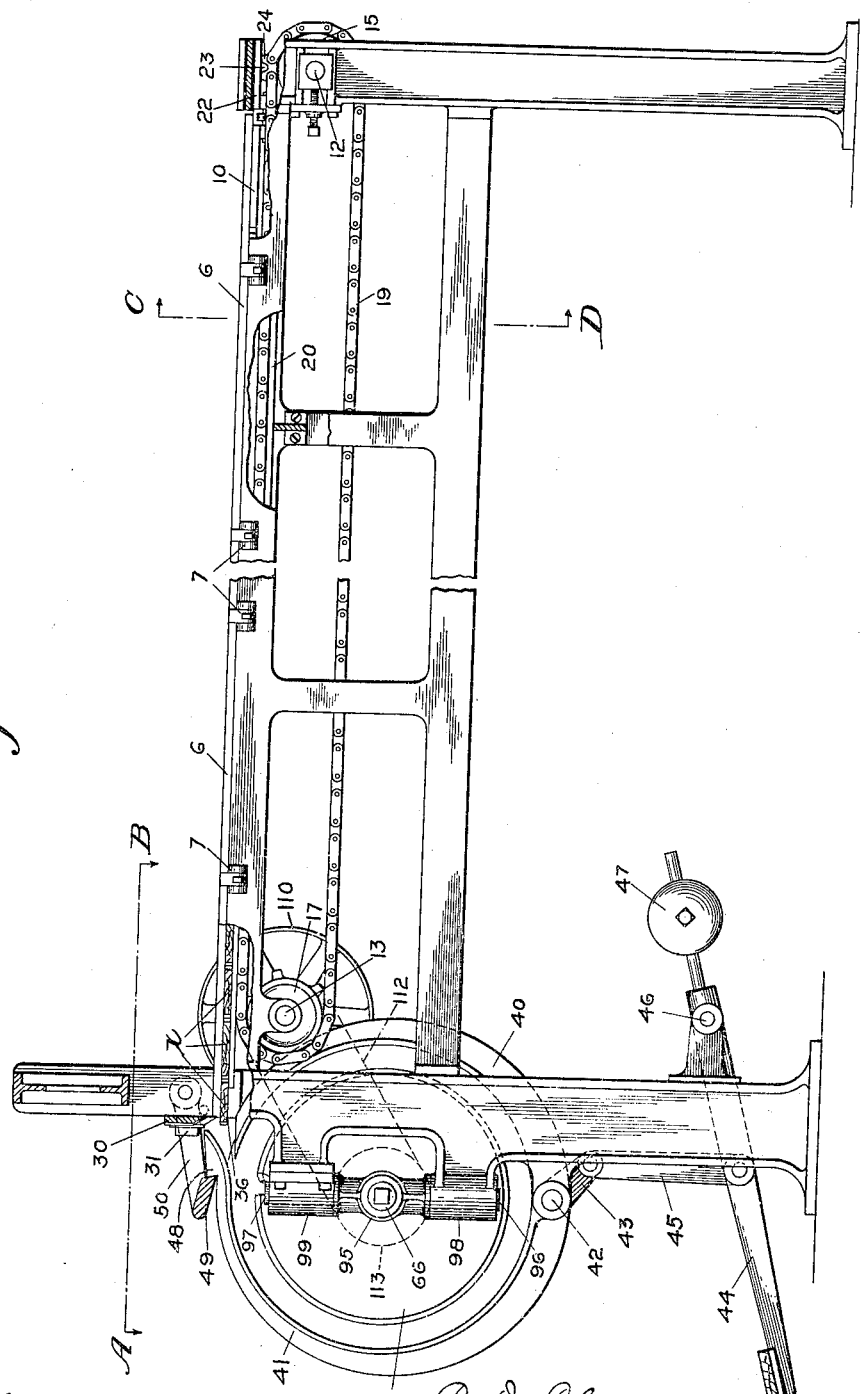

C. D. CLARK.
BARREL MAKING MACHINE.
APPLICATION FILED AUG. 9, 1911.
1,103,562.
Patented July 14, 1914.
4 SHEETS—SHEET 3.
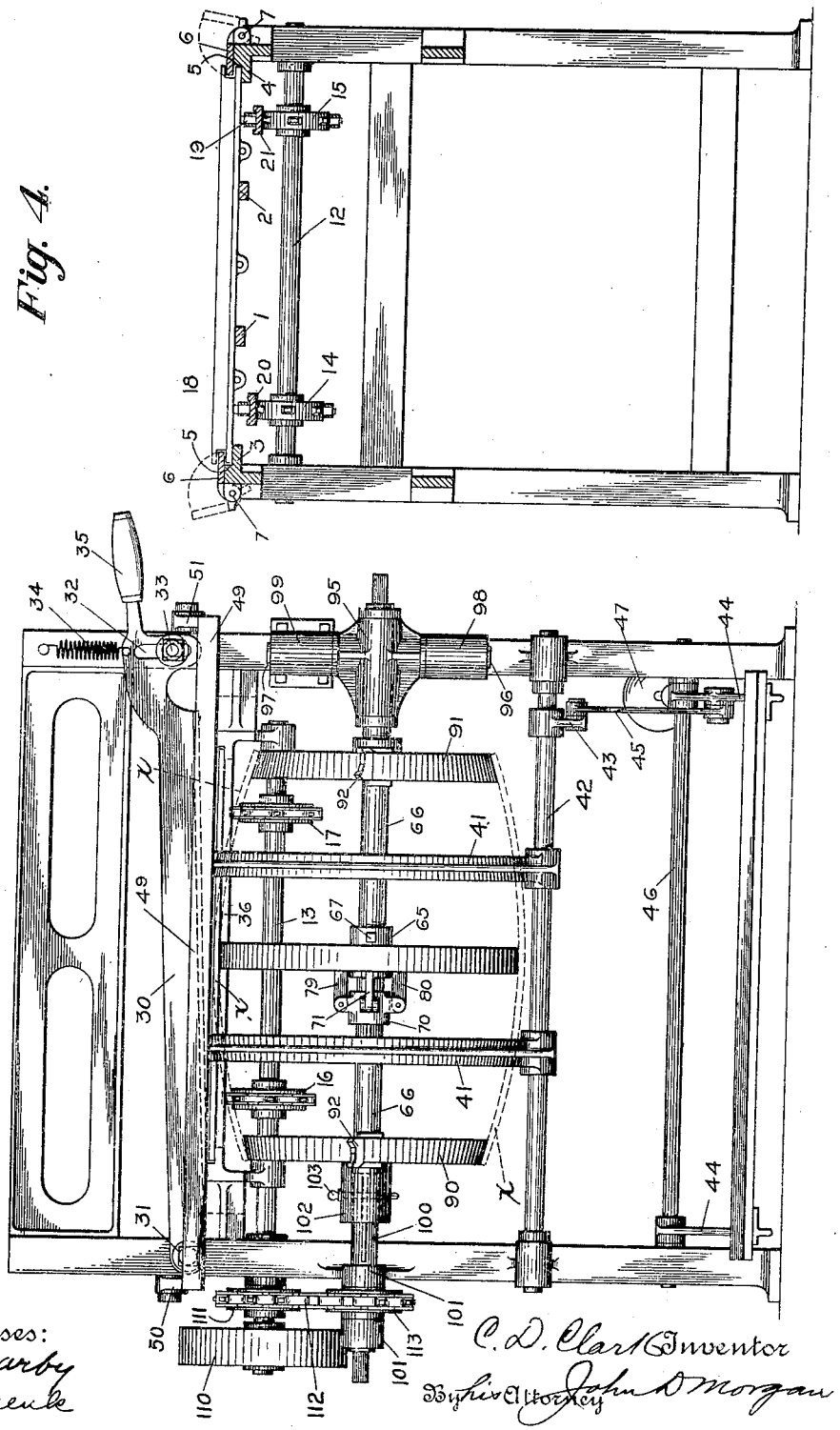

C. D. CLARK.
BARREL MAKING MACHINE.
APPLICATION FILED AUG. 9, 1911.
1,103,562.
Patented July 14, 1914.
4 SHEETS—SHEET 4.
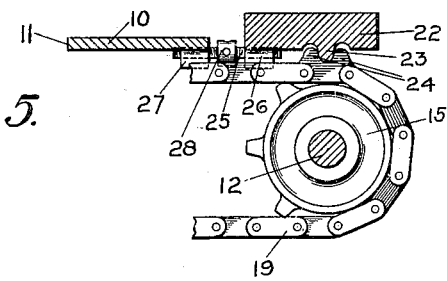
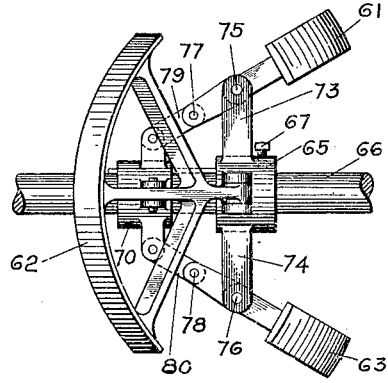
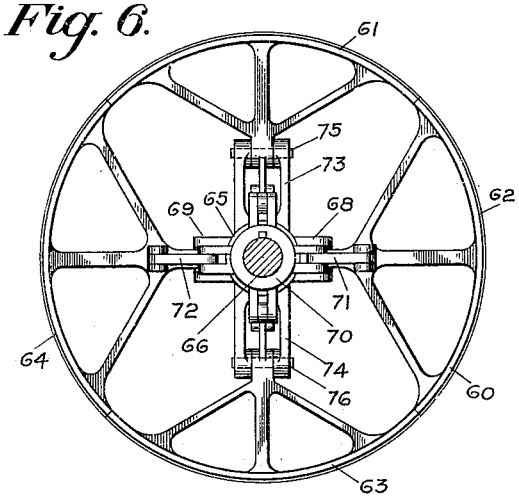
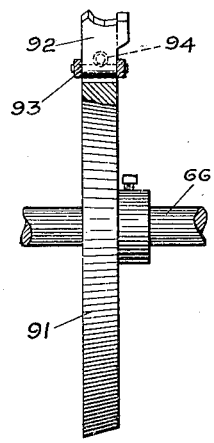
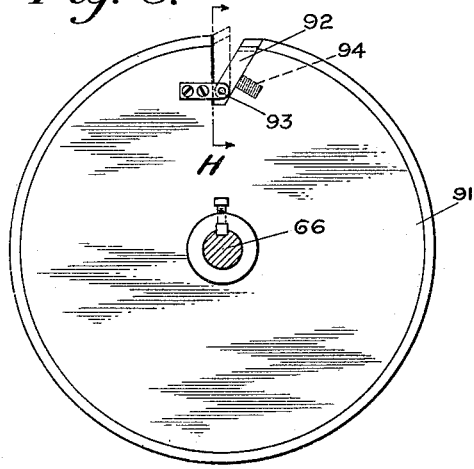
Witnesses:
John Darby
Rose Menk
C. D. Clark Inventor
By his Attorneys John D. Morgan

UNITED STATES PATENT OFFICE.

CLAUDE D. CLARK, OF NEW YORK, N. Y.

BARREL-MAKING MACHINE.

1,103,562.  Specification of Letters Patent.  Patented July 14, 1914.

Application filed August 9, 1911. Serial No. 643,189.

*To all whom it may concern:*

Be it known that I, CLAUDE D. CLARK, a citizen of the United States, residing at New York city, in the county of New York and State of New York, have invented certain new and useful Improvements in Barrel-Making Machines, of which the following is a specification.

The invention relates to barrel making machines, and more especially to machines in which the staves are laid out upon a support, and then passed through the machine to be brought into general circular form and to be bent into proper shape to receive the hoops.

The objects of the invention will be found set forth hereinafter, or will be obvious herefrom to those skilled in the art, and the means, devices and mechanisms whereby said objects are realized are pointed out in the appended claims.

The invention consists in the novel parts, arrangements, constructions, combinations and improvements herein shown and described.

The accompanying drawings, referred to herein and forming a part hereof, illustrate one embodiment of the invention, the same serving in connection with the description herein to explain the principles of the invention.

Of the drawings: Figure 1 is a top plan of a machine (the top part of the frame being removed on the line A—B of Fig. 2) embodying the principles of the invention; Fig. 2 is a front elevation looking at Fig. 1 from the right; Fig. 3 is an end elevation looking at Fig. 2 from the left; Fig. 4 is a transverse section on the line C—D of Fig. 2 looking in the direction of the arrows; Fig. 5 is a fragmentary sectional view on the line E—F of Fig. 1, looking in the direction of the arrows; Fig. 6 is a detail elevation, on an enlarged scale, of the middle interior forming disk; Fig. 7 is a side elevation corresponding to Fig. 6 but showing the disk collapsed; Fig. 8 is an elevation of the end forming disk showing the device for cutting the chime and croze; Fig. 9 is a side elevation looking at Fig. 8 from the left and being cut away on the line G—H of Fig. 8.

Referring to the accompanying drawings, which constitute by way of example an embodiment of the invention, means are provided for assembling a sufficient number of staves to make a barrel and also means for trimming one of the staves so that the length of the assembled staves will be precisely that required to form a barrel of the desired circumference. In the embodied form of such means, supporting devices are provided by which the staves may be laid along in series edge to edge and at the same time measured to the proper length for making a barrel and be in position to trim or cut off an end stave lengthwise thereof to have the series of staves of the same length as the barrel circumference. In the embodied form, the staves are supported in a plane and preferably horizontally. Such embodied form comprises supports 1 and 2 across which the staves are laid. Supports 3 and 4 for the ends of the staves are arranged alongside the supports 1 and 2.

The members 3 and 4 not only support the staves from underneath but in the embodied form constitute means for holding the staves in edge to edge position and also to guide them in their progress into the barrel forming mechanism. As constructed by way of example, therefore, they also overhang the ends of the staves to keep them in place when the staves are slid along into the barrel forming mechanism. As embodied, said members 3 and 4 are formed with a supporting portion beneath the corresponding end of the stave, and upon which the end of the stave rests. Each has also a vertical portion 5 of substantially the thickness of the staves, or a little thicker, which serve to aline the staves lengthwise. The overhanging portion 6 is movable into and out of position for holding or guiding the staves. Said parts 6 are preferably hinged, or pivoted, at 7 and may be turned back out of the way while the staves are being assembled (see dotted lines Fig. 4) and are then turned down to overhang or inclose the ends of the staves (as will be clear from Figs. 1 and 4) to the position shown in full line in Fig. 4.

Means are provided for gaging the length of the series of staves and also for progressing them into the barrel forming mechanism, and in the present embodiment, certain devices are provided having these combined functions and also coöperating with a trimming knife to cut the end stave (marked *x* in Figs. 1 and 2) of proper width so that the series will form the exact barrel circumference. The embodied form comprises a follower 10 having edges 11 against which the end stave is positioned. The progressing means for said follower in the embodied form comprise shafts 12 and 13, and sprocket wheels 14 and 15 carried by shaft 12 and sprocket wheels 16 and 17 carried by shaft 13. Sprocket chains 18 and 19 work over said sprocket wheels, the upper reaches of said chains running along and upon supports 20 and 21. A carriage 22 has formed at each side thereof teeth 23, each of which engages with corresponding teeth 24 upon the corresponding chains 18 and 19. The carriage 22 slides in the ways formed by the supports 3 and 4, said carriage carrying the follower 10 in front of it. The carriage and follower are adjustably connected, the embodied form of such adjustable connections comprising right and left screw-threaded rods 25 threaded into lugs 26 on the carriage and into lugs 27 upon the follower. Each rod 25 has a turning head 28. Accurate adjusting means are thereby provided for the follower. The cutting device is located at the other end of the row of staves, and just the distance of a barrel circumference from the follower. Said cutting device comprises a knife 30 curved lengthwise to the shape of a stave edge, said knife being pivoted upon the machine frame at 31 and having at its opposite end a slot 32 in which works the guide bolt or pin 33. A restoring spring 34 is shown acting upon the knife, the knife being also provided with an actuating handle 35. The support beneath the last stave x has an edge 36 forming a cutting edge to coöperate with the knife 30.

The barrel forming means comprises interior and exterior members between which the staves are progressed in a generally circular path, said members being of proper size and varying in size along the barrel in order to give the staves the proper barrel form. The exterior forming members or guides are shown two in number arranged at either side of the central interior former. Each of said guides or formers is shown with a stationary portion 40, and with a movable portion 41 fixed to a shaft 42 journaled on the machine frame. Fixed to the shaft 42 is an arm 43 connected to pedal levers 44 by a pivoted link 45. Said pedal levers are fulcrumed on the machine frame at 46 and are provided with a counter-weight 47. The members 41 are held in closed position by means of notches 48 formed in the ends thereof, which are engaged by a bail 49, pivoted to the machine frame by means of arms 50 and 51. It will be noted (especially from Fig. 2) that the ends of the members 40 and 41 are separated to permit the staves to slide in therebetween when pushed forward by the follower 10, the outwardly curved ends of the members 41 guiding the staves inwardly while said ends are held firmly in position by the bail 49. It will be seen also that the members 3 and 6 also serve as guides to direct the series of staves edgewise into the former.

Three interior formers are provided, one at or near the center of the barrel and one at either end thereof. The central interior former 60 is shown collapsible to permit the removal of the barrel. In the embodied form the periphery of the former is shown in separate segments 61, 62, 63 and 64. The hub 65 of said former is fixed to a shaft 66 by the clamping bolt 67. The opposite segments 62 and 64 are pivoted to the hub 65 at 68 and 69, respectively, and are pivotally connected by the respective pivoted links 71 and 72, to a collar 70, splined on the shaft 66. The segments 61 and 63 are pivoted to the spiders 73 and 74, respectively, at the points 75 and 76. Said segments extend beyond their pivot points 75 and 76, and beyond said points are pivoted at 77 and 78 to said sliding collar 70 by the respective links 79 and 80. It will thus be noted that when the hub 70 is slid along the shaft 66 the former will collapse as shown in Fig. 7, two opposite segments swinging inwardly toward the shaft in one direction and the other opposite segments swinging inwardly or toward the shaft 66 in the opposite direction as shown in Fig. 7. The end of the barrel will then pass over the former when the barrel is removed from the machine.

The end interior formers 90 and 91 are shown at either end of the barrel, and in accordance with one feature of the invention not only do they form end interior formers, but also cut the chime and the croze in the ends of the staves. Said formers 90 and 91 are fixed to the shaft 66. The chime forming device comprises a cutter head 92 pivotally mounted at 93 upon the former and normally lying in an inclined position with the cutter substantially in alinement with or slightly below the periphery of the former as shown in full lines in Fig. 8. A spring 94 acts upon the cutter head 92 tending to restore it from the dotted line position shown in Fig. 8 in which position its cutting edge projects beyond the periphery of the former. Said cutter heads 92 are in the inoperative position when the staves are run into the barrel forming mechanism, the interior formers rotating with the staves. If the former be rotated in the opposite direction, it will be seen that the cutter heads will rise into the dotted line position shown in Fig. 8, and would cut the end of the staves in the desired shape.

For the purpose of removing the barrel, the bearing 95 for the shaft 66 is mounted to swing longitudinally of itself, and for this purpose said bearing is provided with pintles 96 and 97 supported in lugs 98 and 99 upon the machine frame. Said shaft 66 is not continuous to the opposite journal bearing but ends beyond the interior former 90. A short shaft 100 is journaled on the machine frame at 101. Splined on said shaft 100 is a sleeve 102, provided with a pin 103. Said sleeve is provided with a slot into which a spline on shaft 66 fits, the pin 103 holding the sleeve 102 in such engaging position. The sleeve 102 may, however, when the pin 103 is removed, be slid along the shaft 100 to disengage the end of the shaft 66. When the treadle 44 is released, the counterweight 47 will throw the members 41 downwardly (to the left referred to Fig. 2), the sleeve 70 is moved along the shaft 66 to collapse the central interior former, and the shaft 66 is swung about its pintles 98 and 99, the barrel may be removed from the machine. Suitable driving means are provided and in the embodied form a pulley 110 is shown fixed to the shaft 13. Fixed to the shaft 13 is shown a sprocket wheel 111 over which runs a sprocket chain 112, said sprocket chain running also over a sprocket wheel 113 fixed on the shaft 100. The machine may be run by hand, if desired by cranks attached to shafts 66 and 100. The ends of the follower are grooved and the members 6 extend thereinto (Fig. 4) as it travels along and serve as guides therefor.

The manner of operation of the herein-described mechanism will be clearly understood from the foregoing description of the various constructions, and the descriptions of operation in connection with the various groups of mechanisms. A brief résumé of the manner of operating the machine will, however, be given. The members 6 are thrown backwardly in the dotted line position shown in Fig. 4, the follower being at the right hand end (referred to Figs. 1 and 2), and the staves are laid along edge to edge in series, one touching the other, as shown in Fig. 1. The surfaces 11 on the follower will true the first stave and bring it to the proper position or measuring distance for a barrel circumference from the knife 30. The last stave (unless it happens to be the exact width required) will project under the knife 30. The knife is pressed downward by its handle 35 and removes the extra width from the stave. The interior former 60 is in the operative or non-collapsed position, as shown in Fig. 6, and the members 41 of the exterior formers or guides are in the closed position as shown in Figs. 1, 2 and 3. The driving of the shaft 113 then progresses the staves between the central interior former 60, and the exterior formers 41, which are so constructed and arranged and of such relative dimensions that the ends of the staves are forced or bent down into close contact with the end interior formers 90 and 91 (see dotted lines $x$ in Fig. 3) thus giving the barrel its permanent shape and size. The hoops for the barrel may be preliminarily placed on the shafts 66 and 100, respectively, and may be slipped on the ends of the barrel after it is formed, and this may be done prior to cutting the croze and chime. If desired, truss hoops may be used. By reversing the drive for the shaft 13, the follower 10 may be restored to position for receiving the staves for the next barrel (see Fig. 1) and at the same time the rotation of the shafts 100 and 66 will cut the chime and croze in the barrel, the friction of the staves against the exterior forming members holding the barrel stationary. The foot of the operator being removed from the pedal, the formers 41 are brought downwardly, and upon sliding the sleeve 102 to the left (referred to Fig. 3), the shaft 66 may be swung outwardly about its pintles 96 and 99, the intermediate interior former 60 is collapsed, and the barrel removed ready to be headed.

What I do claim as my invention and desire to secure by Letters Patent, is:

1. A barrel making machine including in combination a support upon which the staves are laid edge to edge, a follower traveling along said support to progress the laid out staves, means for positioning the follower at the rear end of its travel, and means located the length of a barrel circumference forward from said position of the follower for cutting a stave lengthwise.

2. A barrel making machine including in combination a support upon which the staves are laid edge to edge, a member movable into position to overlap the ends of the laid out staves upon the support, a follower moving along said support to progress the series of laid out staves therealong, and a groove in the end of the follower into which said movable member extends during the movement of said follower.

3. A barrel making machine including in combination a barrel forming device including interior and exterior members, a cutter on an interior former member and means for rotating said interior former member relatively to the formed barrel.

4. A barrel making machine including in combination a barrel forming device including interior and exterior members, a cutter on an interior former member and means for rotating said interior former member relatively to the other former members and to the barrel held thereby.

5. A barrel making machine including in combination a barrel forming device including interior and exterior members, a cutter on an interior former member, and means for rotating said interior former member relatively to the other former members and to the barrel held thereby, means for holding the said cutter in the non-cutting position when the said end interior former is moved in one direction, and means responsive to a reverse movement of the said end interior cutter when the barrel is held by the said other former members to move the said cutter to the cutting position.

6. A barrel making machine including in combination a barrel forming device having interior and exterior members between which the staves are progressed to be formed into barrel shape, a shaft upon which an interior former member is mounted, said shaft being separable near an end of said barrel, the portion upon which the barrel is carried being mounted to swing out of alinement with the other portion to permit removal of the barrel.

In testimony whereof, I have signed my name to this specification, in the presence of two subscribing witnesses.

CLAUDE D. CLARK.

Witnesses:
JOHN D. MORGAN,
ROSE MENK.

Copies of this patent may be obtained for five cents each, by addressing the "Commissioner of Patents, Washington, D. C."